Aug. 3, 1954 G. E. DANN 2,685,152
THERMOMETER TUBE-BLANK MANUFACTURE
Filed Oct. 23, 1951
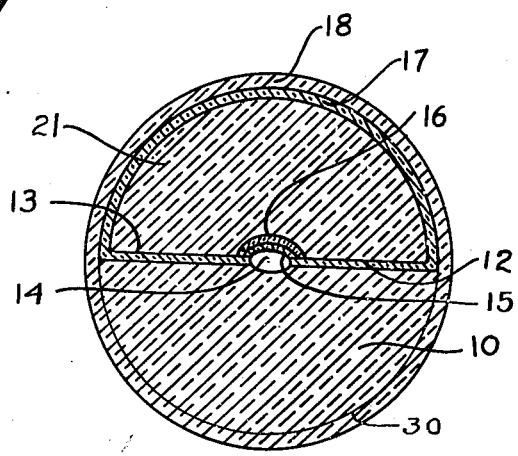
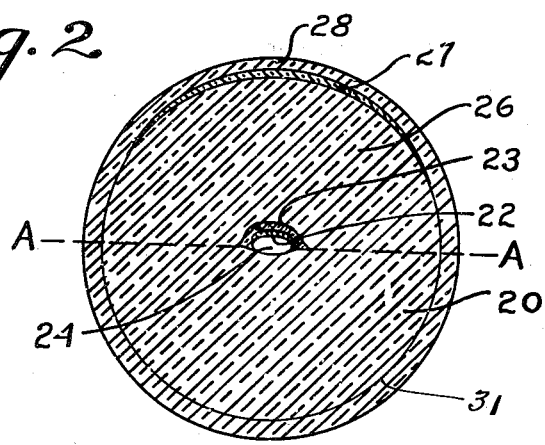
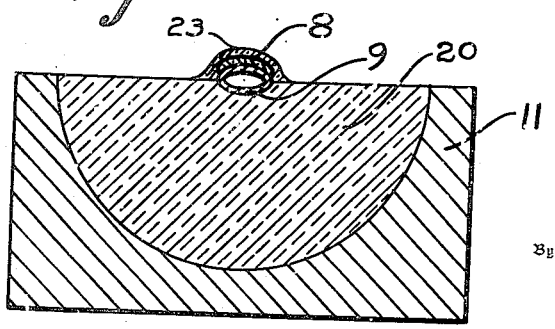
Inventor
GUY E. DANN
By Rolf E. Schneider
Attorney Patented Aug. 3, 1954

2,685,152

UNITED STATES PATENT OFFICE 2,685,152

THERMOMETER TUBE-BLANK MANUFACTURE

Guy E. Dann, Corning, N. Y., assignor to Corning Glass Works, Corning, N. Y., a corporation of New York Application October 23, 1951, Serial No. 252,696

2 Claims. (Cl. 49—79)

The present invention relates to an improved method of making blanks from which thermometer tubing can be drawn.

The object of the invention is to provide a new and simplified method of making a blank for drawing thermometer tubing provided with a stripe or backing of red or other contrasting-color glass visible only through the bore above the fluid therein.

The manufacture of blanks for the drawing of such thermometer tubing may be conveniently and is conventionally carried out with the aid of a two-section cylindrically shaped mold and a cooperative mandrel such, for example, as disclosed in the Moeller Patent No. 1,753,801 granted April 8, 1930. The first step of such conventional method is to fill one mold section with molten clear glass; then the cooperative mandrel is positioned on the exposed surface of such clear glass along the longitudinal center of the mold. Ribbons of molten white or other opaque glass are next applied on either side of the mandrel and to the lateral margins of the mold cavity. Advantageously, a thin layer of molten clear glass is subsequently applied to the exposed surface of the mandrel, which layer is then covered over with a layer of molten red glass, for forming the bore-backing stripe, in volume sufficient to follow the mandrel contour and to contact the white or opaque glass. The use of the thin layer of clear glass has been found to be helpful in obtaining proper placement of the red glass about the mandrel. The remaining section of the mold is subsequently filled with molten clear glass, and the mold is closed. The blank is now removed from the mold and a backing of molten opaque glass is applied to the outer wall surface of that half of the blank formed in the last-filled mold section and is joined to the exposed margins of the first-applied white or opaque glass strips. The last-applied glass serves as the usual backing applied to thermometers and in addition is required to completely shield the red stripe from views which do not pass through the tubing bore.

My improved method differs from the above in that a rod or cane, preferably crescent-shaped in cross-section, of red or any other desired color-contrasting glass is clamped along the top side of the mandrel before its placement along the longitudinal center of the first-filled mold section. Molten white or opaque glass is then spread over the cane in an amount to adequately cover the exposed surface of the cane. So that the bore-backing stripe which is to be formed from the color-contrasting glass will be properly shielded, the cane of such glass is advantageously such in cross-section that it does not extend peripherally on either side of the mandrel to the clear glass contained in the first mold section; and sufficient molten opaque glass is applied over such cane to cover the remainder of the exposed side-walls of the mandrel. The remaining section of the mold is now filled with molten clear glass and the mold is closed as in the former method. Heat transmitted to the cane from the surrounding molten glass softens the cane and causes it to exactly conform to the mandrel contour. After the blank is removed from the mold, the usual backing of molten white or opaque glass may if desired be applied to the exterior surface of that half of the blank formed in the last-filled mold section. This latter backing is not however required to shield the red stripe since the white or opaque glass applied directly to the red glass and down over the portions of the mandrel sides not covered by the cane adequately accomplishes this function.

It is a feature of the present procedure that the color-contrasting glass is utilized in a hard, solid cane form whereby formation of the blank is considerably facilitated. In this manner, moreover, a substantially uniform application of the color-contrasting glass along the mandrel is made possible without any difficulty.

In the accompanying drawing:

Fig. 1 is a sectional elevation of a thermometer tubing blank made by the above-described conventional method.

Fig. 2 is a similar view of a thermometer tubing blank made in accordance with the present invention.

Fig. 3 is a sectional elevation of one section of a longitudinally split mold showing in similar sectional elevation, a portion of the blank of Fig. 2 during the course of its formation.

Referring now to the drawing in detail, the conventional blank of Fig. 1 comprises a clear glass portion 10 formed in one semicyclindrical mold section such as 11 (Fig. 3) of a split mold. Numerals 12 and 13 designate the white or opaque glass ribbons or strips applied on either side of a mandrel such as 9 (Fig. 3) for forming the bore 14. Numeral 15 designates the thin layer of clear glass applied over the mandrel, and numeral 16 designates the red glass for forming the bore-backing stripe. Numeral 21 designates the clear glass with which the second section of the mold is filled, and numeral 17 the white or opaque glass applied after the removal of the blank from the mold. Numeral 18 designates the usual further or finally applied annular layer of clear glass. (The dividing line between the portion 10 and the annular layer 18 is indicated by the light line 30.)

Referring now to Fig. 2, the blank made in accordance with the present invention comprises a clear glass portion 20 (below the interrupted line A—A) formed in the initially filled mold section, such as 11 (Fig. 3). Red glass 22 is the end product of the crescent-shaped hard red glass cane 8 (Fig. 3) originally clamped to the top side of mandrel 9. The numeral 23 designates the white or opaque glass which overlays the red glass 22 and also forms small portions of the wall of bore 24 between the edges of the red glass 22 and the clear glass 20. This white glass thus shields the red glass from view except when seen through the lens portion comprising glass 20. Numeral 26 designates the clear glass above line A—A formed in the second section of the mold. Numeral 27 designates the conventional backing of white or opaque glass, which may be applied in the usual manner but which is entirely divorced from the shield of opaque glass 23. The numeral 28 designates the conventional annular layer of clear glass that may be applied after the application of the layer of glass 27 (the light line 31 shows the division between lens portion 20 and annular layer 28).

As will be appreciated from the above description, the instant method involves fewer and more readily performed steps than required by the former method for the production of tubing of equal or better operating characteristics and of greatly improved appearance.

While the present procedure has been described in connection with the formation of a cylindrically shaped blank, it will be appreciated that it is equally applicable to the formation of blanks of other cross-sectional configurations; and the term "cylindrical segment" as used in the claims is to be understood as including any such other configuration.

What is claimed is:

1. The method of making a glass blank from which thermometer tubing can be drawn, which comprises forming a cylindrical segment of the blank from molten clear glass, placing a bore-forming mandrel on the flat surface of such segment along the longitudinal center thereof, clamping on such mandrel a hard cane of a color-contrasting glass of such cross section that it extends only part way around the exposed portion of the mandrel, spreading a layer of molten glass of a further contrasting color over said cane and the remainder of the mandrel, and then forming the remaining segment of the blank about the latter color-contrasting glass.

2. The method of making a glass blank from which thermometer tubing can be drawn, which comprises forming a cylindrical segment of the blank from molten clear glass, placing a bore-forming mandrel on the flat surface of such segment along the longitudinal center thereof, surrounding only part of the exposed portion of the mandrel with a crescent-shaped hard cane of a color-contrasting glass, spreading a layer of molten glass of a further contrasting color over said cane and over the remaining exposed portions of the mandrel, and then forming the remaining segment of the blank about the latter color-contrasting glass.

References Cited in the file of this patent

UNITED STATES PATENTS

| Number | Name | Date |
| --- | --- | --- |
| 1,696,400 | Hespe | Dec. 25, 1928 |
| 1,753,801 | Moeller | Apr. 8, 1930 |
| 2,198,741 | Said | Apr. 30, 1940 |